Oct. 29, 1968 R. E. R. MONDINEU 3,407,959

TROLLEY FOR CONVEYING AND HANDLING VARIOUS PRODUCTS

Filed Jan. 6, 1967 2 Sheets-Sheet 1

INVENTOR
Remy Etienne Roger Mondineu
by
Wolf, Greenfield + Hieken

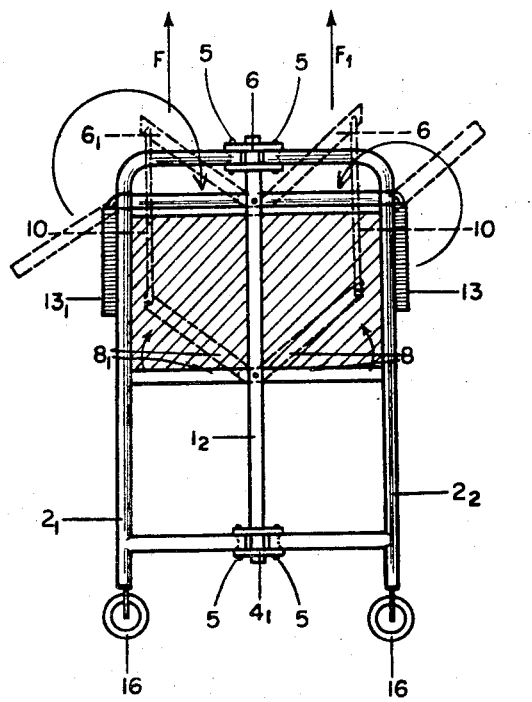

United States Patent Office 3,407,959
Patented Oct. 29, 1968

3,407,959
TROLLEY FOR CONVEYING AND HANDLING
VARIOUS PRODUCTS
Remy Etienne Roger Mondineu, 1 Rue des Grands
Augustins, Paris, France
Filed Jan. 6, 1967, Ser. No. 607,769
Claims priority, application France, Jan. 17, 1966,
46,165
4 Claims. (Cl. 220—6)

ABSTRACT OF THE DISCLOSURE

A portable trolley for carrying articles comprising a rigid, U-shaped frame with two pairs of articulated frame members pivotally secured to the arms of the frame. An upper, movable frame having a pair of opposed arms are parallely supported above a pair of trays between the frame arms and are adapted to pivot with the trays upwardly to a folded position with the frame members pivoting inwardly toward one another for complete closure. A container of solid or mesh material is also secured between the arms.

---

The invention relates to a trolley intended more particularly for conveying and handling bulk products, this trolley being essentially formed of an articulated trolley that can assume two positions, the one, opened out (utilizing position) the other, turned back (arranging position), and also a fixed or movable receptacle hung on the articulated frame for accommodating the product to decant or convey.

The invention relates to a trolley for conveying and handling various products, of the type formed by a frame, and frame-members provided with wheeling members, a trolley characterized in that on the one hand, it comprises means making it pliable, and on the other, an upper frame to which elements are connected acting for receiving a receptacle in which the products to be decanted or conveyed can be accumulated.

According to one characteristic of the invention, the upper frame comprises a movable lid able to close the top part of the trolley.

According to another characteristic of the invention, the frame consists of a rigid U-shaped frame on whose vertical arms there are hinged, on the one hand, tubular arms of the upper frame, and on the other, hinged trays forming the receiving surface of the receptacle.

A trolley in accordance with the invention is shown by way of non-restrictive example in the attached drawings, in which:

FIGURE 2 is an end view of the trolley of FIGURE 1 and

Figure 1:
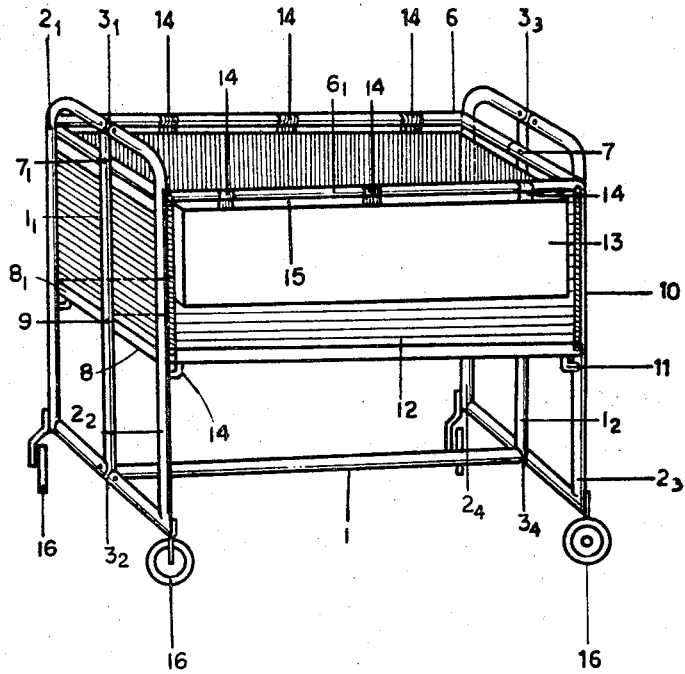
FIGURE 1 is a perspective view of the trolley according to the invention fitted with a receptacle.

This invention provides a trolley which is adjustable, that is, one that can assume two positions. In one position it is opened out, and is adapted for use; in the other, it is folded for storage.

In a preferred embodiment, the trolley is made of a frame comprising a rigid frame 1 having a U-shape, the upwardly extending arms $1_1$ and $1_2$ of this frame forming the middle uprights on which the articulated frame members $2_1$, $2_2$, $2_3$, $2_4$ are rotatably mounted.

These frame members 2, $2_2$, $2_3$, and $2_4$ forming one of the parts of the frame are articulated at their top and bottom ends $3_1$, $3_2$, $3_3$, $3_4$ by means of caps 4 and $4_1$ (FIGURE 2).

These caps 4 and $4_1$ comprise semi-cylindrical sections which receive the top and bottom ends of the frame-members, the latter being fitted to rotate freely on spindles 5 traversing the walls of the cap at the ends of the frame members.

An upper, movable, U-shaped frame made of two articulated tubular arms 6 and $6_1$ each of which is adapted to pivot angularly upwards (from a horizontal position to a vertical one) in relation to two horizontal axes 7 and $7_1$ around which they pivot.

This upper movable frame, like the frame members and rigid part of the frame, is made of tubular members with the ends of the arms forming the U-shaped, movable frame being connected at the articulation axes 7 and $7_1$ by being slightly flattened so as to facilitate their mounting.

Under this articulated frame and at a certain distance from it, elements are provided to hold a receptacle, the latter completing the trolley.

These receptacles or receiving elements may comprise, for example, two trays 8 and $8_1$ articulated on vertical articulation axles 9, mounted on the arms $1_1$ and $1_2$ of the rigid part of the frame.

The articulated upper frame is secured to the external edges of the lower trays 8 and $8_1$ by small connecting bars 10 of which one of the ends of each of them is attached to the periphery of the upper frame and the other to each external corner of the trays 8 and $8_1$.

The lower trays 8 and $8_1$ are held in a horizontal position by stops 11 attached to the frame members $2_1$, $2_2$, $2_3$, $2_4$ of the frame of the trolley.

The articulated arms 6 and $6_1$ of the upper frame are, in this case, kept horizontal by bearing on the lower trays 8 and $8_1$ by means of connecting links 10.

The distance between the upper articulated frame and the receiving trays 8 and $8_1$ determines a space in which the receptacle 12 is placed.

The bottom of this receptacle rests on the receiving trays 8 and $8_1$, said receptacle being securely held in position by stops against the frame members $2_1$, $2_2$, $2_3$, $2_4$.

This receptacle can be made of any kind of material, cardboard, for instance if required to be thrown away after using, or else of wood of the same kind as that of the trays 8 and $8_1$ or even of plastic so as to be cleaned each time after being used.

Another important characteristic of the invention lies in the fact that the receptacle can be closed by trays 13 and $13_1$ (FIGURE 2) articulated on the external edges of the movable arms 6 and $6_1$ of the upper frame.

These trays are articulated by metal clips 14 surrounding the section of the frame, their ends being connected to the longitudinal edge 15 of each tray.

In this case, the stop members are provided on the internal periphery above so as to keep the trays 13 and $13_1$ horizontal, and to prevent the latter from falling into the inside of the receptacle.

In this case, the covering trays 13 and $13_1$ when held horizontal, form a receiving surface capable of receiving any kind of objects.

Each frame member $2_1$, $2_2$, $2_3$, $2_4$ has a small wheel 16 capable of pivoting on itself so as to allow the trolley to be turned in any position.

FIGURE 2 shows diagrammatically and in broken lines, the articulated arms 6 and $6_1$ of the upper frame, as well as the lower trays 8 and $8_1$ in a folded position with the frame and said trays forming two distortable parallelograms defined by their bases, (the middle uprights $1_1$ and $1_2$ of the rigid part of the frame) and the small connecting bars 10.

If upward movement is continued in the direction of the arrows F and $F_1$, the articulated arms 6 and $6_1$ and the lower trays 8 and $8_1$ become vertical, i.e., parallel to the U-shaped uprights $1_1$ and $1_2$ of the frame.

During this movement, the closing trays 13 and 13₁ are integral with the articulated parts of the frame, the latter not being visible in FIGURE 2 as these trays are concealed by the thickness of the tubes forming the upper frame.

When the upper frame, the closing trays 13 and 13₁ and the lower trays 8 and 8₁ are turned back parallel to the middle uprights 1₁ and 1₂ of the rigid part of the frame, we can then proceed to turn back the frame members, so as to bring them against the lower vertical trays, by making them pivot towards the inside in relation to their articulation point 5.

This total folding of the trolley cannot, of course, be done until the receptacle 12 has been withdrawn; nevertheless, a pliable receptacle can also be provided.

Figure 3:
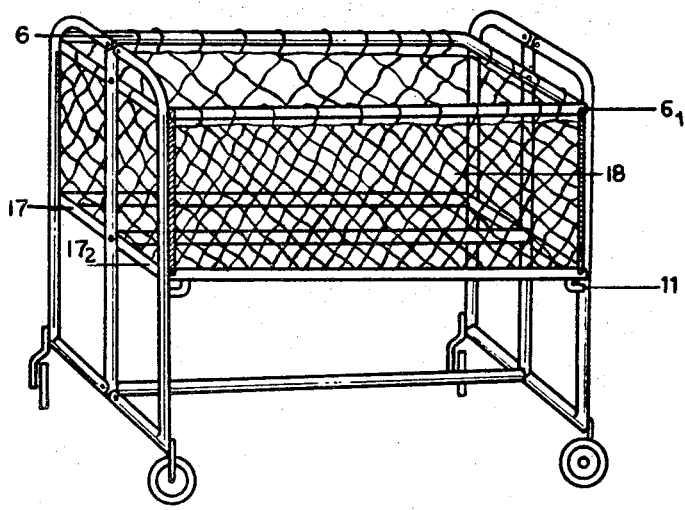
FIGURE 3 is a perspective view of an alternative embodiment in which the receptacle had been replaced by a wire-netting basket.

According to one alternate embodiment, as shown in FIGURE 3, the trolley is made of the same constitutive elements as those shown in FIGURE 1, with the exception that the elements used for holding the receptacle are made, not by trays, but by a lower frame formed by two articulated tubular elements 17 and 17₁, said frame being held in a horizontal position, just like the example shown in FIGURE 1, by means of fixed stops 11.

According to this alternate embodiment, the receptacle is replaced by a wire-netted basket 18, the latter being suitable for handling work, and in particular for sorting mail in post offices and stations.

In this case, the bottom of this basket does not require to be securely supported, the upper periphery of said basket being solidly connected to the articulated arms 6 and 6₁ of the upper frame.

This embodiment is given by way of example, so as to show that in starting from the fundamental idea of the invention (namely, an adjustable trolley comprising an upper frame in which means are provided for accommodating a receptacle), we may provide a whole series of embodiments, without going outside of the scope of the invention for that purpose.

The trolley according to the invention has numerous advantages as compared with known trolleys, in this sense, that it is adjustable and on this account can be reduced to a minimum size.

Furthermore, the closing trays 13 and 13₁ have the interest of being able to close the receptacle, while forming a receiving surface that can act as a table, for instance, when the reception is withdrawn.

To this end, the trolley has the interest of being able to be used for cleaning purposes in communities, such as hospitals, dining halls, canteens or barracks.

As a matter of fact, it is easy for a person clearing the table, to collect the rubbish on a dining hall table so as to slide it into the receptacle of the trolley, while bringing the latter up to the table.

On the other hand, the receptacle can also be divided into two parts, one for the rubbish, the other for the dishes collected on the tables to be cleared.

In this case, a simple trellis-work basket, housed in the receptacle, would be perfectly suitable.

To simplify these cleaning operations, it is possible to provide on the frame members or on the rigid frame, telescopic means enabling the receptacle to be adjusted for height, so as to be able to bring its upper edge level with the table to be cleared.

In this same embodiment, locking means would ensure the secure holding of the receptacle in the chosen position.

What I claim is:

1. A portable trolley for conveying and handling various products and adapted to be folded to and from an open position comprising, a rigid, U-shaped frame having upwardly extending arms, two pairs of articulated frame members positioned with a pair adjacent each of said arms and pivotally secured thereto for movement from an open position perpendicular to the vertical plane of said U-shaped frame to a closed position parallel to said plane, an upper movable frame comprising a pair of opposed, U-shaped arms with each pivotally secured at their free ends to the upper end of said upwardly extending arms for movement from an open position horizontal and perpendicular to said plane to a closed position parallel to said plane, and a pair of frames lying in planes parallel to the planes of said upper movable frame with means pivotally securing said trays to said upwardly extending arms for movement parallel to the movement of said upper movable frame.

2. A trolley according to claim 1, having a pair of pivotable lids, means securing said lids with one to each of said arms of said movable frame for pivoting movement from a position parallel to the planes of said upper movable frame to a closed position perpendicular to said upper movable frame.

3. A trolley according to claim 1, in which said frames are held in a horizontal position by stops attached to each of said articulated frame members, said upper movable frame pivotally secured to said trays by small connecting bars.

4. A trolley according to claim 1, having a wire netted basket hung on said upper movable frame, and a lower frame made of two articulated tubular elements supporting the bottom of said basket.

References Cited

UNITED STATES PATENTS

| | | | |
|---|---|---|---|
| 593,889 | 11/1897 | Horn | 220—110 |
| 2,020,766 | 11/1935 | Brown | 280—36 |
| 3,074,734 | 1/1963 | Hunson et al. | 211—132 |

BENJAMIN HERSH, *Primary Examiner.*

R. SONG, *Assistant Examiner.*